June 20, 1950 G. E. EZBELENT 2,512,269
HYDRAULIC SHOCK ABSORBER
Filed Jan. 29, 1947
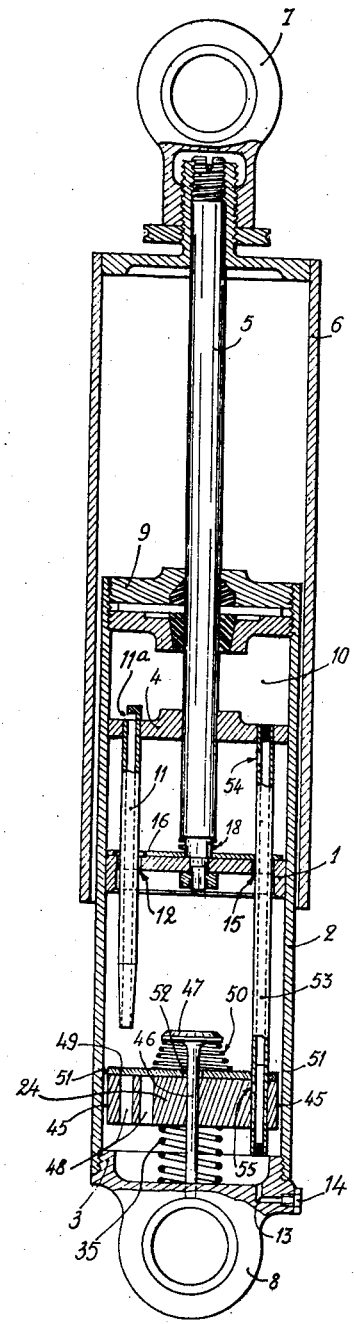
INVENTOR
GEORGES EUGENE EZBELENT
BY Richardson and David
ATTYS Patented June 20, 1950

2,512,269

UNITED STATES PATENT OFFICE 2,512,269

HYDRAULIC SHOCK ABSORBER

Georges Eugène Ezbelent, Paris, France

Application January 29, 1947, Serial No. 724,982
In France June 27, 1945

4 Claims. (Cl. 188—88)

The invention concerns hydraulic shock-absorbers of the type substantially comprising a piston sliding in a cylinder filled with liquid, a valve allowing the liquid to freely pass from one side to the other of the piston and preventing the liquid from returning in the reverse direction and a narrow passage of variable section allowing the liquid to return with a progressive throttling action.

One object of the invention is to provide a shock-absorber of this type and in which the section of passage of the liquid in one or the other direction and from one side to the other of the piston can be automatically modified with respect to the strength and the frequency of the shocks to be absorbed.

Hydraulic shock-absorbers are well known which comprise a passage of variable section for providing the progressive action characteristic of the operation. But, in these devices, the law of variation of the section is predetermined and cannot be modified automatically during the operation with respect to the kind and the frequency of the shocks. Furthermore, in said devices, the passage of variable section ensures a throttling action only in one direction i. e. the return direction when the shock-absorber expands after the shock. In certain cases, specially at the moment of the landing of an aircraft, it is now also necessary to throttle the passage of the liquid during the first part of the operation of the shock-absorber and, in other cases, for example when a motor vehicle or an aircraft is rolling on the ground and when the shocks are numerous and repeated to high frequency, the liquid may pass freely, without any throttling action, in the two directions from one side to the other of the piston.

This result and other advantages are obtained with the hydraulic shock-absorber constructed in accordance with my invention as represented in the annexed drawing wherein.

The drawing shows a vertical sectional view of an improved form of shock absorber, constructed in accordance with my invention;

In the embodiment of my invention illustrated in the drawing, the shock absorber is one which is especially adapted for use on motor vehicles of the usual type.

1 denotes the piston of the shock-absorber, which moves within a cylinder 2 between a bottom 3 and an intermediate bottom 4 forming a capacity filled with liquid. The piston rod 5 is integral with a cylindrical protecting and guiding jacket 6 sliding on the cylinder 2 and is connected by means of a ring 7 to one of the elements of the vehicle, frame or axle, the cylinder 2 being attached to the other element through the medium of a ring 8. The intermediate bottom 4 forms with the second bottom 9 of the cylinder a capacity 10 of constant volume, communicating with the interior of the cylinder 2 through a hollow rod 11 of variable external section and traversing the piston 1 through a calibrated orifice 12 providing a restricted annular passage of variable section around said rod 11 on account of the form of the rod 11. The chamber 10 is adapted to contain a volume of liquid at least equal to that of the piston rod 5 when the piston 1 sinks into the cylinder 2. The rod 11 opens at the bottom of chamber 10 through a lateral orifice 11a allowing the liquid to fill the chamber from bottom to top and preventing possible formation of an emulsion of liquid and air. An opening 13 closed by a plug 14 is provided in the bottom 3 for the filling of the cylinder.

The communication between the chambers located at either side of the piston is ensured, besides the orifice 12, by orifice 15 provided in the piston 1 and adapted to be obturated by means of a disc-valve 16 having a diameter less than that of the piston 1 and traversed with a play by the rod 11 so as to allow a passage along the inner wall of the cylinder 2 and along the external face of said rod 11. The valve 16 is freely slipped over the end of the rod 5 and is applied against the upper face of the piston by a spring 18, in order to close the orifice 15.

A weight 24 is slidably mounted at the end of the cylinder 2 with a lateral play 45 and is guided by a cylindrical rod 46 secured to the bottom 3 and provided with a head 47. The return spring 35 of the weight 24 bears upon the bottom 3. The weight 24 is further provided with holes 48 closed at the upper part by a disc-valve 49 applied on the weight 24 by a spring 50 bearing on the head 47 of the rod 46. Plays 51 and 52 are respectively provided between the valve 49 and the inner wall of the cylinder 2, and between the valve 49 and the rod 46. To the intermediate bottom 4 is secured a tubular cylindrical rod 53 passing through the valve 16, the piston 1 (with play), the valve 49 and the weight 24. The rod 53 is closed at its two ends and is provided with an orifice 54 opening under the bottom 4 and an orifice 55 closed by the weight 24 in its upward position.

The operation is as follows:

When the vehicle is submitted to a shock, the weight 24 rapidly sinks opening the orifice 55, the liquid under the weight 24 passes through the holes 48 and, the valve 49 being remote from the weight 24, through the plays 51 and 52. The piston 1 sinks normally, the valve 16 being open and the liquid passing into the chamber above said piston through orifices 12, 15 and 55, the rod 53 and the orifice 54 and into the chamber 10, through the rod 11 and the orifice 11ª. During the return movement, the weight 24, which operates as a dash pot, slowly goes up again, the valve 49 thrust by the spring 50, closing the holes 48 and the liquid passage section being limited to the play 45. During a short time at the beginning of the upward return travel of the piston 1, the orifice 55 remains open and the shock absorbing is weak, then the weight 24, thrust by the spring 35, closes again the orifice 55 and the shock-absorber operates normally the liquid flowing through the play provided within the valve 16 around the rod 11 and the calibrated orifice 12 and, the valve 16 and the rod 11 braking the upward return travel of the piston 1.

In the case of multiple repeated shocks, the weight 24 has not the time to go up again to the upward end position, the orifice 55 remains open and the shock-absorber remains yielding as it is necessary for example on a road with bad covering.

Having now described my invention what I claim as new and desire to secure by Letters Patent is:

1. In a hydraulic shock-absorber comprising a cylinder filled with liquid and a piston sliding in said cylinder, orifices provided in said piston, a valve for controlling the passage of the liquid through said orifices, a cylindrical weight slidably mounted with play in the bottom end of said cylinder and provided with holes, a valve for controlling said holes at the upper face of said weight, a spring bearing on the bottom of said cylinder and acting on said weight in the upward direction, a fixed cylindrical tubular rod parallel to the axis of said cylinder, passing through said piston valve, piston, weight valves and weight and provided at its two ends with orifices for connecting the two parts of said cylinder situated above and under said piston, the lower orifice being closed by said weight at its upper position.

2. A hydraulic shock-absorber as claimed in claim 1 further comprising a cylindrical rod secured to the bottom of said cylinder for axially and slidably guiding said weight and provided at its upper part with a head constituting the fixed part of said weight valve.

3. In a hydraulic shock absorber of the type comprising a piston sliding in a cylinder filled with liquid, a passage adapted to allow the liquid to pass from one side to the other of said piston, and means for controlling said passage in response to variations in the shock, said controlling means comprising, a weight slidably mounted within said cylinder, passages adapted to allow the liquid to pass from one side to the other of said weight and means for controlling certain of said passages.

4. A hydraulic shock absorber as claimed in claim 3 wherein said last named means comprises a valve adapted to prevent liquid to flow through certain of said passages during the return travel of said weight.

GEORGES EUGÈNE EZBELENT.

REFERENCES CITED

The following references are of record in the file of this patent:

UNITED STATES PATENTS

| Number | Name | Date |
|---|---|---|
| 2,329,803 | Whisler | Sept. 21, 1943 |